(12) United States Patent
Bauder et al.

(10) Patent No.: US 11,850,770 B2
(45) Date of Patent: Dec. 26, 2023

(54) METHOD FOR PRODUCING SPHERICAL THERMOPLASTIC POLYMER PARTICLES

(71) Applicant: BASF SE, Ludwigshafen am Rhein (DE)

(72) Inventors: Andreas Bauder, Ludwigshafen am Rhein (DE); Kerstin Muelheims, Ludwigshafen am Rhein (DE); Michael Freese, Lemfoerde (DE); Achim Stammer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/596,628

(22) PCT Filed: Jun. 18, 2020

(86) PCT No.: PCT/EP2020/066966
§ 371 (c)(1),
(2) Date: Dec. 15, 2021

(87) PCT Pub. No.: WO2020/254498
PCT Pub. Date: Dec. 24, 2020

(65) Prior Publication Data
US 2022/0250283 A1 Aug. 11, 2022

(30) Foreign Application Priority Data

Jun. 18, 2019 (EP) ..................................... 19180876

(51) Int. Cl.
| | |
|---|---|
| *B29B 9/10* | (2006.01) |
| *B29B 9/12* | (2006.01) |
| *B29B 9/16* | (2006.01) |
| *B33Y 10/00* | (2015.01) |
| *B33Y 70/00* | (2020.01) |
| *B33Y 80/00* | (2015.01) |
| *B29C 64/153* | (2017.01) |
| *B29C 48/36* | (2019.01) |
| *C08J 3/16* | (2006.01) |
| *B29K 75/00* | (2006.01) |

(52) U.S. Cl.
CPC .................. *B29B 9/10* (2013.01); *B29B 9/12* (2013.01); *B29C 48/36* (2019.02); *B29C 64/153* (2017.08); *B33Y 10/00* (2014.12); *B33Y 70/00* (2014.12); *B33Y 80/00* (2014.12); *C08J 3/16* (2013.01); *B29B 2009/166* (2013.01); *B29K 2075/00* (2013.01); *C08J 2375/04* (2013.01)

(58) Field of Classification Search
CPC ..... B29B 2009/166; B29B 9/065; B29B 9/06; B29B 9/10; C08J 3/12; C08J 3/124; C08J 3/126; B01J 2/06
See application file for complete search history.

(56) References Cited

U.S. PATENT DOCUMENTS

| | | | | |
|---|---|---|---|---|
| 3,060,510 A | * | 10/1962 | Fischer ..................... | C10C 3/16 264/9 |
| 3,468,986 A | * | 9/1969 | Watanabe ............... | C10G 73/40 406/197 |
| 3,505,434 A | * | 4/1970 | Battaerd .................... | C08J 3/12 264/15 |
| 4,863,646 A | * | 9/1989 | Watanabe .................. | C08J 3/12 264/9 |
| 6,168,733 B1 | * | 1/2001 | Naylor ..................... | B29B 9/12 264/14 |
| 8,604,101 B2 | | 12/2013 | Ren et al. | |
| 9,777,134 B2 | * | 10/2017 | Uenlue ..................... | C08K 3/08 |
| 2002/0146509 A1 | * | 10/2002 | Kodokian .................. | C08J 3/12 427/222 |
| 2008/0103277 A1 | * | 5/2008 | Campbell .................. | C08J 3/12 528/417 |

(Continued)

FOREIGN PATENT DOCUMENTS

| | | |
|---|---|---|
| WO | 2017/070061 | 4/2017 |
| WO | 2018/106525 | 6/2018 |

OTHER PUBLICATIONS

International Preliminary Report on Patentability and Written Opinion dated Dec. 21, 2021 in PCT/EP2020/066966, with English translation, 15 pages.
Kunststoffhandbuch, 7, "Polyurethane", Carl Hanser Verlag, $3^{rd}$ Edition, Section 3.1, 1993.
Kunststoffhandbuch, 7, "Polyurethane", Carl Hanser Verlag, $1^{st}$ Edition, 1966, pp. 103-113.
Schmidt et al., "Optimized polybutylene terephthalate powders for selective laser beam melting", Chemical Engineering Science, vol. 156, 2016, pp. 1-10.

*Primary Examiner* — Mary Lynn F Theisen
(74) *Attorney, Agent, or Firm* — Grüneberg and Myers PLLC

(57) ABSTRACT

A process for producing particles of a thermoplastic polymer in spherical form involves providing at least one thermoplastic polymer in a molten state and providing an aqueous solution of at least one surface-active substance. The aqueous solution is in a temperature range from 100 to 300° C. The process also involves dispersing the thermoplastic polymer in the aqueous solution to obtain an aqueous solution containing dispersed thermoplastic polymer, which is cooled down to a temperature below the solidification point of the thermoplastic polymer to obtain a suspension containing an aqueous solution and particles of the thermoplastic polymer suspended in a solid state and in spherical form. The particles can be separated from the suspension and, optionally, dried. The particles obtained from the process have a particle size distribution having a d[4,3] value of more than 10 μm and a $d_{90.3}$ value of more than 20 μm.

15 Claims, 3 Drawing Sheets

(56) References Cited

U.S. PATENT DOCUMENTS

| | | | | |
|---|---|---|---|---|
| 2017/0008233 A1* | 1/2017 | Vontorcik, Jr. | ........ | C08G 18/42 |
| 2020/0032005 A1* | 1/2020 | Kim | ....................... | C08G 63/06 |
| 2020/0325284 A1* | 10/2020 | Farrugia | .................... | C08J 3/14 |
| 2020/0338816 A1* | 10/2020 | Dippel | .................... | B29C 64/25 |
| 2022/0024119 A1* | 1/2022 | Dippel | .................... | C08L 75/04 |
| 2022/0041889 A1* | 2/2022 | Verbeke | ................ | B29C 64/153 |

* cited by examiner

METHOD FOR PRODUCING SPHERICAL THERMOPLASTIC POLYMER PARTICLES

CROSS-REFERENCE TO RELATED APPLICATIONS

This application is the National Stage entry under § 371 of International Application No. PCT/EP2020/066966, filed on Jun. 18, 2020, and which claims the benefit of priority to European Application No. 1918076.5, filed on Jun. 18, 2019. The content or each of these applications is hereby incorporated by reference in its entirety.

BACKGROUND OF THE INVENTION

Field of the Invention

The present invention relates to a process for producing particles of a thermoplastic polymer, wherein the particles are in spherical form and have a particle size distribution having a d[4,3] value of more than 10 µm and a $d_{90.3}$ value of more than 20 µm. The invention further relates to particles of a thermoplastic polymer in spherical form, obtained or obtainable by this process, and to particles of a thermoplastic polymer in spherical form per se, wherein the particles have a particle size distribution having a d[4,3] value of more than 10 µm and a $d_{90.3}$ value of more than 20 µm. The invention additionally relates to the use of particles of a thermoplastic polymer in spherical form, preferably in the form of a powder, preferably having a particle size distribution having a d[4,3] value of more than 10 µm and a $d_{90.3}$ value of more than 20 µm, for additive manufacturing methods.

Description of Related Art

Processes for producing polymer particles in aqueous dispersion and the use of the dispersion are described in U.S. Pat. No. 8,604,101 B2. Since the resultant dispersions are intended for application to substrates in order to achieve a polymer coating of maximum uniformity thereon, the focus is on aqueous dispersions having very finely distributed, very small particles, meaning that the particles have a weight-average diameter of less than 10 µm. These particle finenesses are required firstly in order to be able to apply very thin layers and secondly in order to obtain a storage-stable dispersion with regard to sedimentation. Overall, the particles remain in dispersion until final application to a substrate, meaning that the particles are not separated from the dispersion or dried prior to the application.

Different processes are used for the production of powders having particles of greater dimensions, i.e. particles having a particle size distribution having a d[4,3] value of more than 10 µm. Mention may be made here, for example, of cold grinding (cryogenic grinding) or else precipitation processes. These processes, however, usually do not generate perfectly spherical particles. In the case of cold grinding, the particles are, for example, angular crushed particles, and the precipitation also gives rise to particles that depart even more from the spherical form. An overview of the possible processes is given, for example, by J. Schmidt et al. (J. Schmidt, M. Sachs, S. Fanselow, M. Zhao, S. Romeis, D. Drummer, K.-E. Wirth, W. Peukert, Chemical Engineering Science 156 (2016) 1-10). The advantage of a powder having spherical particles over one having non-spherical particles—given the same particle size distribution—is improved flowability. This is advantageous in the case of use of such a powder, when it is used, for example, in additive manufacturing methods (explicit mention should be made here of the methods of powder bed fusion, high-speed sintering and multi-jet fusion) or in powder coating methods (powder sintering, powder slush or slush molding).

SUMMARY OF THE INVENTION

It was therefore an object of the invention to provide a process by which a powder having spherical particles of a thermoplastic polymer can be provided.

The object is achieved by a process for producing particles of a thermoplastic polymer, said particles being in spherical form, comprising
  i) providing at least one thermoplastic polymer in the molten state;
  ii) providing an aqueous solution of at least one surface-active substance, said aqueous solution of the at least one surface-active substance being at a temperature in the range from 100 to 300° C., preferably 150 to 250° C.;
  iii) dispersing the at least one thermoplastic polymer from (i) in the aqueous solution of the surface-active substance from (ii) to obtain an aqueous solution comprising dispersed thermoplastic polymer;
  iv) cooling down the aqueous solution obtained in (iii) that comprises dispersed thermoplastic polymer to a temperature below the solidification point of the thermoplastic polymer to obtain a suspension comprising an aqueous solution and particles of the thermoplastic polymer suspended therein in the solid state, said particles being in spherical form;
  v) separating the particles of the thermoplastic polymer in spherical form from the suspension obtained in (iv);
  vi) optionally drying the particles in spherical form that have been separated off in (v);
wherein the particles in spherical form that have been separated off in (v) and optionally dried in (vi) have a particle size distribution having a d[4,3] value of more than 10 µm and a $d_{90.3}$ value of more than 20 µm.

DETAILED DESCRIPTION OF THE INVENTION

Figure 1:
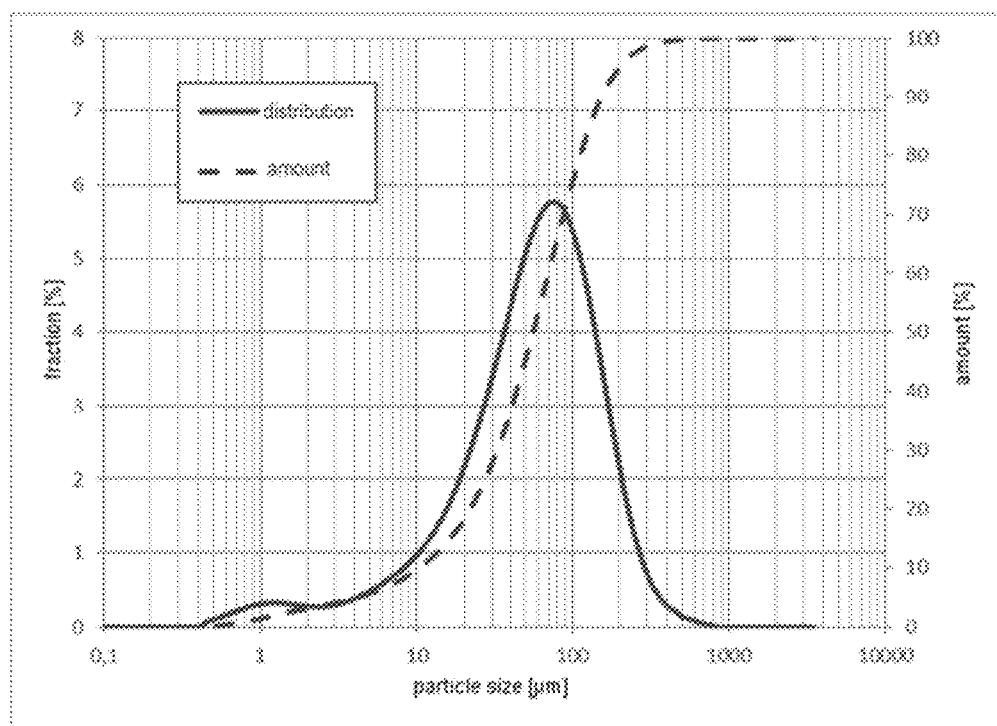
FIG. 1 shows the density distribution and the cumulative volume distribution of the spherical TPU particles produced according to example 1.

It has been found that, surprisingly, the spherical particles obtained by the process described above, no matter what their size within the parameter range mentioned, had a spherical shape and did not show any surface unevenness. A corresponding powder has good flowability.

Particle size distribution was determined by means of a Mastersizer 3000 laser diffraction spectrometer from Malvern Panalytical GmbH, 71083 Herrenberg. This measurement method is known to the person skilled in the art. The expression "d[4,3] value" describes the average particle size by what is called the De Brouckere diameter d[4,3], with the particle size obtained being volume-weighted, meaning that particles of greater diameter have greater weight in the signal. The "$d_{90.3}$, value" and the "$d_{50.3}$ value" serve to describe a particle size distribution of a particle assembly, with 90% by volume and 50% by volume respectively of the particles having a smaller size than the values reported in the respective case. The same applies to the "$d_{10.3}$ value", meaning that 10% by volume of the particles in each case here have a smaller size than the respective value reported.

In a preferred embodiment of the process for producing particles of a thermoplastic polymer, said particles being in spherical form, steps (i) to (vi), i.e. (i), (ii), (iii), (iv), (v) and (vi), are essential, meaning that the process comprises the drying in (vi) in an essential manner.

In one embodiment of the process for producing particles of a thermoplastic polymer, said particles being in spherical form, (i) comprises:
  (i.1) providing at least one thermoplastic polymer in the solid state;
  (i.2) melting the at least one thermoplastic polymer to obtain the at least one thermoplastic polymer in the molten state, said melting preferably being effected by heating the at least one thermoplastic polymer to a temperature above the glass transition temperature Tg, further preferably above the melting temperature Tm.

The melting in (i.2) is preferably effected in an extruder or by means of extrusion.

The expression "molten" in step (i) or (i.2) also comprises partly molten variants in which at least 80% by weight, preferably at least 90% by weight, further preferably at least 95% by weight, further preferably at least 99% by weight, of the at least one thermoplastic polymer has been melted. The upper temperature limit for the melting and further processing of the thermoplastic polymer depends on the particular polymers. The person skilled in the art will be aware that it has to be chosen such that the viscosity is low enough to be able to convey the polymer in question through pipelines into the dispersing machine and in order to be able to comminute the polymer to the desired droplet fineness in the flow field of the dispersion apparatus. On the other hand, it must not be chosen at too high a level in order that any unwanted variation in the molar mass/mass distribution is avoided. It must on no account be so high that breakdown of the polymer occurs.

Step (iii) preferably comprises steps (iii.1) and (iii.2):
  (iii.1) adding the at least one thermoplastic polymer obtained in (i) in the molten state to the aqueous solution of at least one surface-active substance provided in (ii);
  (iii.2) dispersing the at least one thermoplastic polymer from (i) or (iii.1) in the aqueous solution of the surface-active substance from (ii or (iii.2) to obtain an aqueous solution comprising dispersed thermoplastic polymer.

Steps (iii.1) and (iii.2) are effected successively and/or simultaneously, meaning that the at least one thermoplastic polymer in the molten state as obtained in (i) is preferably added continuously or discontinuously, preferably continuously, to the aqueous solution of at least one surface-active substance as provided in (ii), wherein the dispersing in (iii.2) is effected continuously or discontinuously, preferably continuously. Advantageously, this results in di-vision of the at least one thermoplastic polymer in the molten state directly and without phase inversion by the shear forces active in the dispersing operation, and correspondingly homogeneous distribution in the aqueous solution of the surface-active substance.

The aqueous solution comprising dispersed thermoplastic polymer as obtained in (iii) is in the form of a dispersion with the aqueous solution of the surface-active substance as continuous phase and the thermoplastic polymer as disperse phase. In one embodiment of the process for producing particles of a thermoplastic polymer, said particles being in spherical form, the molten thermoplastic polymer is dispersed in the aqueous solution of the surface-active substance in (iii) under the action of mechanical force, ultrasound and/or high-pressure homogenization to obtain an aqueous solution comprising dispersed thermoplastic polymer. The dispersing of the molten thermoplastic polymer in the aqueous solution of the surface-active substance is preferably effected in a dispersing apparatus known to those skilled in the art, for example stirrers, static mixers, dynamic dispersing machines such as rotor-stator dispersing machines such as toothed wheel dispersing machines, colloid mills and dynamic flow mixers, and rotor-rotor dispersing machines. In addition, dispersion can also be effected by means of ultrasound or with the aid of a high-pressure homogenizer.

In one embodiment of the process for producing particles of a thermoplastic polymer, said particles being in spherical form, dispersing in (iii) is effected at a temperature in the range from 100 to 300° C., preferably in the range from 150 to 250° C.

In one embodiment of the process for producing particles of a thermoplastic polymer, said particles being in spherical form, the cooling in (iv) is effected to a temperature in the range from 20 to 100° C. preferably to a temperature in the range from 30 to 70° C.

The separating-off in step (v) can be effected by means of methods known to the person skilled in the art, for example by filtration or centrifugation or a mixture of filtration and centrifugation, or successive filtration and centrifugation or centrifugation and filtration.

In one embodiment of the process for producing particles of a thermoplastic polymer, the particles in spherical form that are separated off in (v) or (vi) have a particle size distribution having a d[4,3] value of more than 20 μm, preferably of more than 50 μm, further preferably of more than 70 μm and/or, preferably and, a $d_{90.3}$ value of more than 50 μm, preferably of more than 100 μm. Preferably, the particles in spherical form that are separated off in (v) or (vi) have a particle size distribution having a $d_{50.3}$ value of more than 20 μm, preferably of more than 30 μm, further preferably of more than 40 μm, further preferably of more than 50 μm.

The classification of the particle size distribution of the powder comprising the spherical particles that is obtained after the optional drying may, for example, be conducted by means of sieving or by windsifting or by a combination of the two methods. It is furthermore also possible to conduct narrowing of the particle size distribution prior to the separating-off in (iv) or the subsequent optional drying in (v) in the suspension, for example by wet sieving or removal in a gravitational or centrifugal field or a combination of the two methods.

In one embodiment of the process for producing particles of a thermoplastic polymer, the dried particles removed in (v) or dried in (vi), said particles being in spherical form, have a particle size distribution having a d[4,3] value in the range from ≥20 to 1000 μm, preferably in the range from ≥50 to 500 μm, further preferably in the range from ≥70 to 200 μm, and/or
  a $d_{50.3}$ value in the range from ≥20 to 500 μm, preferably in the range from ≥30 to 300 μm, further preferably in the range from ≥40 to 400 µm, further preferably in the range from ≥50 to 100 µm,
and/or
a $d_{90.3}$ value in the range from ≥50 to 500 µm, preferably in the range from ≥100 to 400 µm, further preferably in the range from ≥150 to 300 µm.

The $d_{10.3}$ value is preferably in the range from 2 to 80 µm, further preferably in the range from 5 to 50 µm, further preferably in the range from 8 to 40 µm.

The drying that optionally follows the separation is effected by means of methods known to the person skilled in the art that have no influence on particle form and particle size distribution. It is the particles separated oil in (v) that are dried, and these constitute the drying material. Suitable methods for the drying of such a drying material are preferably selected from the group of heating, freeze drying, supercritical drying, microwave drying, vacuum drying, adsorption drying, condensation drying and use of heating gases. Devices used for drying are preferably selected from the group consisting of paddle dryers, belt dryers and (dry) suction filters.

In one embodiment of the process for producing particles of a thermoplastic polymer, the at least one thermoplastic polymer is selected from the group consisting of polyurethane, polyester, polyetherester, polyesterester, polyamide, polypropylene, polyetheramide, polybutadiene-styrene and ethylene-vinyl acetate, further preferably from the group consisting of thermoplastic polyurethane (TPU); polyamide, polyamide copolymer, and polyester, further preferably comprises at least TPU. In the preparation of the thermoplastic polymer, especially the TPU, further compounds such as catalysts, for example, and/or customary auxiliaries and/or additives may be used. Customary auxiliaries are, for example, fillers, flame retardants, nucleating agents, oxidation stabilizers, lubricants and mold release aids, dyes, pigments and optionally stabilizers, for example for protection against hydrolysis, light, heat or discoloration, inorganic and/or organic fillers, reinforcers and plasticizers. Customary auxiliaries and additives can be found for example in the "Kunststoffhandbuch" [Plastics Handbook] ("Kunststoffhandbuch"; 7. "Polyurethane" (Polyurethanes), Carl Hanser Verlag, 1st edition, 1966, pages 103-113).

Thermoplastic polyurethane (TPU) is known to the person skilled in the art. In one embodiment, a TPU is based on the following components:
at least one compound (C1) having at least two isocyanate-reactive groups;
at least one isocyanate (I1);
at least one diol (D1).

The molar ratio of the at least one diol (D1) to the at least one isocyanate (I1) is typically in the range from 1:3 to 3:1. The molar ratio of the at least one diol (D1) to the at least one isocyanate (I1) is preferably in the range from 1:1 to 1:2, preferably in the range from 1:1.2 to 1:1.8, further preferably in the range from 1:1.4 to 1:1.6.

The at least one compound (C1) can be any compound having at least two isocyanate-reactive groups. The isocyanate-reactive groups are preferably hydroxy or amino groups. The at least one compound (C1) can be added to modify the properties of the TPU. Any compound can be used as long as it is capable of giving a thermoplastic polyurethane with the mixture of the at least one diol (D1) and the at least one isocyanate (I1). For example, the at least one compound (C1) may be a polyol, or alternatively a polymer having at least two hydroxy groups or at least two amino groups other than a polyol, for example a hydrophobic polymer or oligomer comprising silicon. In a preferred embodiment, the at least one compound (C1) having at least two isocyanate-reactive groups is a polyol. Polyols are known to those skilled in the art and described for example in "Kunststoffhandbuch, 7, Polyurethane", Carl Hanser Verlag, 3rd edition 1993, section 3.1. Polyols that are used with preference are polymeric compounds having hydrogen atoms reactive toward isocyanates. It is possible here to use all suitable polymers, for example polyetherpolyols or polyesterpolyols or mixtures of two or more of these, preferably polyetherdiols or polyesterdiols, or mixtures of two or more of these. Suitable polyether diols are, for example, polyetherdiols based on tetrahydrofuran (THF), ethylene oxide (EO) or propylene oxide (PO) or mixtures thereof, for example copolymers such as block copolymers. In addition, any suitable polyesterdiol can be used, with polyesterdiol here also including polycarbonatediols. Preference is given to using at least one polyesterdiol.

The at least one isocyanate (I1) is preferably at least one polyisocyanate (I1). Polyisocyanates (I1) that may be used are aliphatic, cycloaliphatic, araliphatic, and/or aromatic polyisocyanates, preferably diisocyanates. Examples include the following aromatic diisocyanates: toluene 2,4-diisocyanate, mixtures of toluene 2,4- and 2,6-diisocyanate, diphenylmethane 4,4'-, 2,4'- and/or 2,2'-diisocyanate (MDI), mixtures of diphenylmethane 2,4'- and 4,4'-diisocyanate, urethane-modified liquid diphenylmethane 4,4'- and/or 2,4'-diisocyanate, 4,4'-diisocyanatodiphenylethane, mixtures of monomeric methane diphenyl diisocyanates and other highly polycyclic homologs of methane diphenyl diisocyanate (polymeric MDI), naphthylene 1,2- and 1,5-diisocyanate. Aliphatic diisocyanates are customary aliphatic and/or cycloaliphatic diisocyanates, for example tri-, tetra-, penta-, hexa-, hepta-, and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate (H12MIDI). In a preferred embodiment, the isocyanate (I1) contains at least hexamethylene 1,6-diisocyanate.

The polyisocyanate can be used in pure form or in the form of a composition, for example as an isocyanate prepolymer. In addition, a mixture comprising polyisocyanate and at least one solvent can be used, suitable solvents being known to those skilled in the art. Polyisocyanate prepolymers can be obtained by means of reaction of the above-described polyisocyanates in excess, for example at temperatures in the range from 30 to 100° C., preferably at more than 80° C., with polyols to obtain the prepolymer. For the preparation of the prepolymer, preference is given to using polyisocyanates and commercially available polyols based on polyesters, proceeding for example from adipic acid, or on polyethers, proceeding for example from tetrahydrofuran, ethylene oxide and/or propylene oxide. Polyols are known to those skilled in the art and described for example in "Kunststoffhandbuch, 7, Polyurethane", Carl Hanser Verlag, 3rd edition 1993, section 3.1. Polyols that are used with preference are polymeric compounds having hydrogen atoms reactive toward isocyanates. Particularly preferred polyols are polyetherpolyols. In the preparation of the polyisocyanate prepolymers, customary chain extenders or cross-linking agents can optionally be added to the polyols. Preferred chain extenders are ethanediol, butanediol, hexanediol and monoethylene glycol, further preferably at least butane-1,4-diol or monoethylene glycol. In this case, the ratio of the organic polyisocyanates to polyols and chain extenders is preferably selected such that the isocyanate prepolymer has an NCO content in the range from 2% to 30% by weight, more preferably in the range from 6% to 28% by weight, more preferably in the range from 10% to 24% by weight.

The diol (D1) used that functions as chain extender may generally be any diol. The diol (D1) is preferably selected from the group consisting of aliphatic, araliphatic, aromatic, and/or cycloaliphatic compounds having a molar mass in the range from 0.05 kg/mol to 0.499 kg/mol, preferably difunctional compounds, for example diamines and/or alkanediols having 2 to 10 carbon atoms in the alkylene moiety, di-, tri-, tetra-, penta-, hexa-, hepta-, octa-, nona-, and/or decaalkylene glycols having from 3 to 8 carbon atoms, especially ethylene 1,2-glycol, propane-1,3-diol, butane-1,4-diol, hexane-1,6-diol, and preferably corresponding oligo- and/or polypropylene glycols such as diethylene glycol, dipropylene glycol, cyclohexane-1,4-diol, cyclohexane-1,4-dimethanol, and neopentyl glycol, and it is also possible to use mixtures. The diols preferably have solely primary hydroxyl groups.

Surface-Active Substance

The aqueous solution provided in (ii) comprises at least one surface-active substance. The surface-active substance is cationic, anionic or neutral. Surface-active substances used are substances known to the person skilled in the art. Mention should be made here by way of example of U.S. Pat. No. 8,604,101 B2, which describes corresponding surface-active substances in columns 7 (line 58) to 13 (line 64). The surface-active substance in the context of the present invention is therefore selected from the group consisting of polymeric sur-face-active substances having a number average molecular weight of more than 2000 g/mol, preferably in the range from 2200 to $10^6$ g/mol; low molecular weight surface-active substances having number averaged molecular weights of up to 2000 g/mol, preferably of up to 1500 g/mol; and mixtures of two or more of these surface-active substances. The low molecular weight surface-active substances are also referred to as emulsifiers. The polymeric surface-active substances likewise include protective colloids, especially water-soluble polymers as described in U.S. Pat. No. 8,604,101 B2. The surface-active substances disclosed in U.S. Pat. No. 8,604,101 B2 in columns 7 (line 58) to 13 (line 64) are incorporated here into the disclosure of the present application by reference.

In a preferred embodiment of the process for producing particles of a thermoplastic polymer, said particles being in spherical form, the at least one surface-active substance is selected from the group of the polyvinylalcohols, preferably the optionally at least partly hydrolysed polyvinylacetates, further preferably the polyvinylacetates that have been hydrolysed to an extent of at least 40%, further preferably to an extent of at least 60%; further preferably, at least Poval 40-80 E is included. Poval 40-80 E is a polyvinylacetate having a hydrolysis level in the range of 78-81% and a viscosity of 37-45 mPa s (4% solution at 20° C. to DIN 53015/JIS K 6726), nonvolatile fractions 97.5+/−2.5, pH 5 to 7.

In one embodiment of the process for producing particles of a thermoplastic polymer, said particles being in spherical form, the at least one surface-active substance is present in an amount in the range from 0.1% to 20% by weight, preferably in the range from 0.5% to 10% by weight, further preferably in the range from 1% to 5% by weight, based in each case on the total weight of the aqueous solution of the at least one surface-active substance from (ii).

The spherical form of the particle of the thermoplastic polymer is characterized by a spherical shape, with "spherical" including sphere and ellipsoid, preference being given to spherical.

The invention further relates to particles of a thermoplastic polymer in spherical form, obtained or obtainable by the process described above.

The invention likewise relates to particles of a thermoplastic polymer in spherical form that have a particle size distribution having a d[4,3] value of more than 10 μm and a $d_{90.3}$ value of more than 20 μm. The details of these particles correspond to those already disclosed at the outset with regard to the process. For example, the at least one thermoplastic polymer is selected from the group consisting of polyurethane, polyester, polyetherester, polyesterester, polyamide, polypropylene, polyetheramide, polybutadiene-styrene and ethylene-vinyl acetate, further preferably from the group consisting of thermoplastic polyurethane (TPU); polyamide, polyamide copolymer, and polyester; further preferably, at least TPU is present. In the preparation of the thermoplastic polymer, especially the TPU, as already mentioned for the process, further compounds such as catalysts, for example, and/or customary auxiliaries and/or additives may be used. Customary auxiliaries are, for example, fillers, flame retardants, nucleating agents, oxidation stabilizers, lubricants and mold release aids, dyes, pigments and optionally stabilizers, for example for protection against hydrolysis, light, heat or discoloration, inorganic and/or organic fillers, reinforcers and plasticizers.

As already mentioned above for the process, thermoplastic polyurethanes (TPUs) are known to the person skilled in the art. In one embodiment, a TPU is based on the following components: at least one compound (C1) having at least two isocyanate-reactive groups; at least one isocyanate (I1) at least one diol (D1), with reference to the description in the section relating to the process for details of these components.

The invention likewise relates to the use of particles of a thermoplastic polymer in spherical form, preferably in the form of a powder comprising particles of a thermoplastic polymer in spherical form, preferably having a particle size distribution having a d[4,3] value of more than 10 μm and a $d_{90.3}$ value of more than 20 μm, for additive manufacturing methods, preferably selected from the group of powder bed fusion, high-speed sintering and multi-jet fusion, or for powder coating methods or for powder sintering (powder slush or slush molding).

The present invention is illustrated in more detail by the following embodiments and combinations of embodiments, which are apparent from the corresponding dependency references and other references, in particular, it should be noted that in every case where a range of embodiments is mentioned, for example in the context of an expression such as "the process according to any of embodiments 1 to 4", each embodiment in this range is deemed to be explicitly disclosed to those skilled in the art. i.e. the wording of this expression should be regarded by those skilled in the art as being synonymous with "the process according to any of embodiments 1, 2, 3, and 4". It is pointed out that the embodiments that follow do not determine the scope of protection, but constitute a suitably structured part of the description directed to general and preferred aspects of the invention.

1. A process for producing particles of a thermoplastic polymer, said particles being in spherical form, comprising
   i) providing at least one thermoplastic polymer in the molten state;
   ii) providing an aqueous solution of at least one surface-active substance, said aqueous solution of the at least one surface-active substance being at a temperature in the range from 100 to 300° C., preferably 150 to 250° C.;
   iii) dispersing the at least one thermoplastic polymer from (i) in the aqueous solution of the surface-active substance from (ii) to obtain an aqueous solution comprising dispersed thermoplastic polymer;
   iv) cooling down the aqueous solution obtained in (iii) that comprises dispersed thermoplastic polymer to a temperature below the solidification point of the thermoplastic polymer to obtain a suspension comprising an aqueous solution and particles of the thermoplastic polymer suspended therein in the solid state, said particles being in spherical form;
   v) separating the particles of the thermoplastic polymer in spherical form from the suspension obtained in (iv);
   vi) optionally drying the particles in spherical form that have been separated off in iv);
   wherein the particles in spherical form that have been separated off in (v) and optionally dried in (vi) have a particle size distribution having a d[4,3] value of more than 10 μm and a $d_{90.3}$ value of more than 20 μm.

2. The process according to embodiment 1, wherein (i) comprises
   (i.1) providing at least one thermoplastic polymer in the solid state;
   (i.2) melting the at least one thermoplastic polymer to obtain the at least one thermoplastic polymer in the molten state, said melting preferably being effected by heating the at least one thermoplastic polymer to a temperature above the glass transition temperature Tg, further preferably above the melting temperature Tm.

3. The process according to embodiment 1 or 2, wherein the molten thermoplastic polymer is dispersed in the aqueous solution of the surface-active substance in (iii) under the action of mechanical force, ultrasound and/or high-pressure homogenization to obtain an aqueous solution comprising dispersed thermoplastic polymer.

4. The process according to any of embodiments 1 to 3, wherein the melting in (i.2) is effected in an extruder or by means of extrusion.

5. The process according to any of embodiments 1 to 4, wherein the dispersing in (iii) is effected at a temperature in the range from 100 to 300° C., preferably in the range from 150 to 250° C.

6. The process according to any of embodiments 1 to 5, wherein the cooling in (iv) is effected to a temperature in the range from 20 to 100° C., preferably to a temperature in the range from 30 to 70° C.

7. The process according to any of embodiments 1 to 6, wherein the particles in spherical form that are separated off in (v) or (vi) have a particle size distribution having a d[4,3] value of more than 20 μm, preferably of more than 50 μm, further preferably of more than 70 μm and/or, preferably and, a $d_{90.3}$ value of more than 50 μm, preferably of more than 100 μm.

8. The process according to any of embodiments 1 to 7, wherein the particles in spherical form that are separated off in (v) or (vi) have a particle size distribution having a $d_{50.3}$ value of more than 20 μm, preferably of more than 30 μm, further preferably of more than 40 μm, further preferably of more than 50 μm.

9. The process according to any of embodiments 1 to 8, wherein the at least one thermoplastic polymer is selected from the group consisting of polyurethane, polyester, polyetherester, polyesterester, polyamide, polypropylene, polyetheramide, polybutadiene-styrene and ethylene-vinyl acetate, further preferably from the group consisting of thermoplastic polyurethane (TPU); polyamide, polyamide copolymer, and polyester, further preferably comprises at least TPU.

10. The process according to any of embodiments 1 to 9, wherein the at least one surface-active substance is selected from the group of polyvinylalcohols, preferably the optionally at least partly hydrolysed polyvinylacetates, further preferably the polyvinylacetates that have been hydrolysed to an extent of at least 40%, further preferably to an extent of at least 60%; further preferably, at least Poval 40-80 E is included.

11. The process according to any of embodiments 1 to 10, wherein the at least one surface-active substance is present in an amount in the range from 0.1% to 20% by weight, preferably in the range from 0.5% to 10% by weight, further preferably in the range from 1% to 5% by weight, based in each case on the total weight of the aqueous solution of the at least one surface-active substance from (ii).

12. The process according to any of embodiments 1 to 11, wherein the spherical form of the particle of the thermoplastic polymer is characterized by a spherical shape, with "spherical" including sphere and ellipsoid, preference being given to spherical.

13. Particles of a thermoplastic polymer in spherical form, obtained or obtainable by the process according to any of embodiments 1 to 12.

14. Particles of a thermoplastic polymer in spherical form, wherein the particles have a particle size distribution having a d[4,3] value of more than 10 μm and a $d_{90.3}$ value of more than 20 μm.

15. The use of particles of a thermoplastic polymer in spherical form, preferably in the form of a powder comprising particles of a thermoplastic polymer in spherical form, preferably having a particle size distribution having a d[4,3] value of more than 10 μm and a $d_{90.3}$ value of more than 20 μm, for additive manufacturing methods, preferably selected from the group of powder bed fusion, high-speed sintering and multi-jet fusion, or for powder coating methods or for powder sintering (powder slush or slush molding).

The examples that follow serve to illustrate the invention, but are in no way limiting in respect of the subject matter of the present invention.

EXAMPLES

1. Chemicals

| Name | Chemical name |
|---|---|
| Polymer 1 | Aliphatic thermoplastic polyester-based polyurethane elastomer having a Shore A hardness of 88 (Elastollan A C 88 A 12 001; BASF Polyurethanes GmbH, Lemförde) |
| Surface-active substance 1 | Party hydrolyzed polyvinylacetate Hydrolysis level 78-81 mol %; is used as a 4% by weight aqueous solution (viscosity 37-45 mPa · s at 20° C. determined to DIN 53015/JIS K 6726) |
| DM water | Demineralized water |
| Antifoam 1 | Aqueous polydimethylsiloxane emulsion having a solids content of 33% by weight and a viscosity at 25° C. of 150 mPa s (pH 7) |

2. Reference Example 1: Production of Spherical Particles of a Thermoplastic Polymer The thermoplastic polymer to be emulsified was metered continuously into an extruder (Collin E16T extruder) by means of a differential metering screw in the form of a pelletized material that was solid at room temperature (23° C.), and it was melted therein at a temperature above Tg, preferably above Tm. The molten thermoplastic polymer was conveyed continuously into a dispersing apparatus with the aid of the extruder. At the same time, a continuous phase that contained at least one interface-active substance (emulsifier) in water was metered continuously into the dispersing apparatus with the aid of a pump via a heat exchanger. In the heat exchanger, the aqueous emulsifier solution was heated to a temperature in the range from 150 to 250° C.

In the dispersing apparatus, the polymer melt was emulsified in the continuous phase as a disperse phase at a temperature in the range from 150 to 250° C. preferably in the range from 170 to 220° C., so as to result in small melt droplets of the thermoplastic polymer that are stabilized against coalescence in the solution by the at least one interface-active substance. Downstream of the dispersing apparatus, the emulsion with the droplets of the thermoplastic polymer present therein was cooled down with the aid of a cooling apparatus to a temperature below the solidification point Tg of the thermoplastic polymer, solidifying the droplets of the thermoplastic polymer. What was thus obtained was a suspension with finely distributed, spherical thermoplastic polymer particles in the continuous phase.

3. Example 1: Production of Spherical TPU Particles

Polymer 1 was melted at a temperature of 220° C. according to the method from reference example 1 and processed further according to the method from reference example 1: surface-active substance 1 was used in a concentration of 2.7% by weight, and the continuous phase thus had the following composition:
  2.7% by weight of emulsifier 1
  0.1% by weight of defoamer 1
  97.2% by weight of DM water
In the heat exchanger, the aqueous emulsifier solution was heated to a temperature in the region of about 170° C.

The dispersing apparatus used was a DLM/S-007 dynamic flow mixer from INDAG, Borsfleet, Germany. In the dispersing apparatus, the polymer melt was emulsified in the continuous phase as a disperse phase at a temperature in the range from 170 to 220° C., with the following conditions in the dispersing apparatus:

Dispersing apparatus speed: 211 rpm
  Continuous phase temperature (aqueous emulsifier solution): 180° C.
  Continuous phase throughput: 4 kg/h
  Melt feed temperature: 220° C.
  Throughput of polymer 1 melt: 0.4 kg/h
  Suspension temperature downstream of the cooling apparatus: 70° C.

The particle size distribution of the dispersed thermoplastic polymer in the suspension was measured with a Malvern Mastersizer 3000 laser diffraction spectrometer. The particle sizes at 90, 50 and 10 percent throughput of the cumulative volume distribution and the weighted average d[4,3] were as follows:
  $d_{90.3} = 155$ μm
  $d_{50.3} = 56$ μm
  $d_{10.3} = 11$ μm
  $d[4,3] = 74$ μm The particle size distribution and cumulative volume distribution are shown in the form of graphs in FIG. 1. FIG. 2 shows an image of the spherical TPU particles created by means of scanning electron microscopy. It is clearly apparent from FIG. 2 in particular that the spherical particles obtained, no matter what size, have a spherical shape and do not show any surface unevenness.

4. Example 2: Production of Spherical TPU Particles with Carbon Black Additization A melt consisting of 62% by weight of polymer 1 and 38% by weight of carbon black was dispersed in an aqueous continuous phase consisting of 97.27% by weight of demineralized water, 2.7% by weight of surface-active substance 1 and 0.03% by weight of defoamer 1, and then cooled.

The dispersing apparatus used was a DLM/S-007 dynamic flow mixer from INDAG, Borsfleet, Germany. The polymer melt was fed to the dispersing apparatus at a temperature of 225° C. and dispersed in the continuous phase, with the following conditions in the dispersing apparatus:

Dispersing apparatus speed: 356 rpm
  Continuous phase temperature: 180° C.
  Continuous phase throughput: 4 kg/h
  Melt feed temperature: 225° C.
  Polymer melt throughput: 0.4 kg/h
  Suspension temperature downstream of the cooling apparatus: 70° C.

The suspension obtained after the cooling was sieved through a sieve having a square mesh size of 400 μm and then dried under reduced pressure at a temperature of 70° C.

The particle size distribution of the dispersed thermoplastic polymer in the suspension was measured with a Malvern Mastersizer 3000 laser diffraction spectrometer. The particle sizes at 90, 50 and 10 percent throughput of the cumulative volume distribution and the weighted average d[4,3] were as follows:

$d_{90.3}$=262 µm
$d_{50.3}$=83 µm
$d_{10.3}$=32 µm
d[4,3]=118 µm

DESCRIPTION OF THE FIGURES

Figure 2:
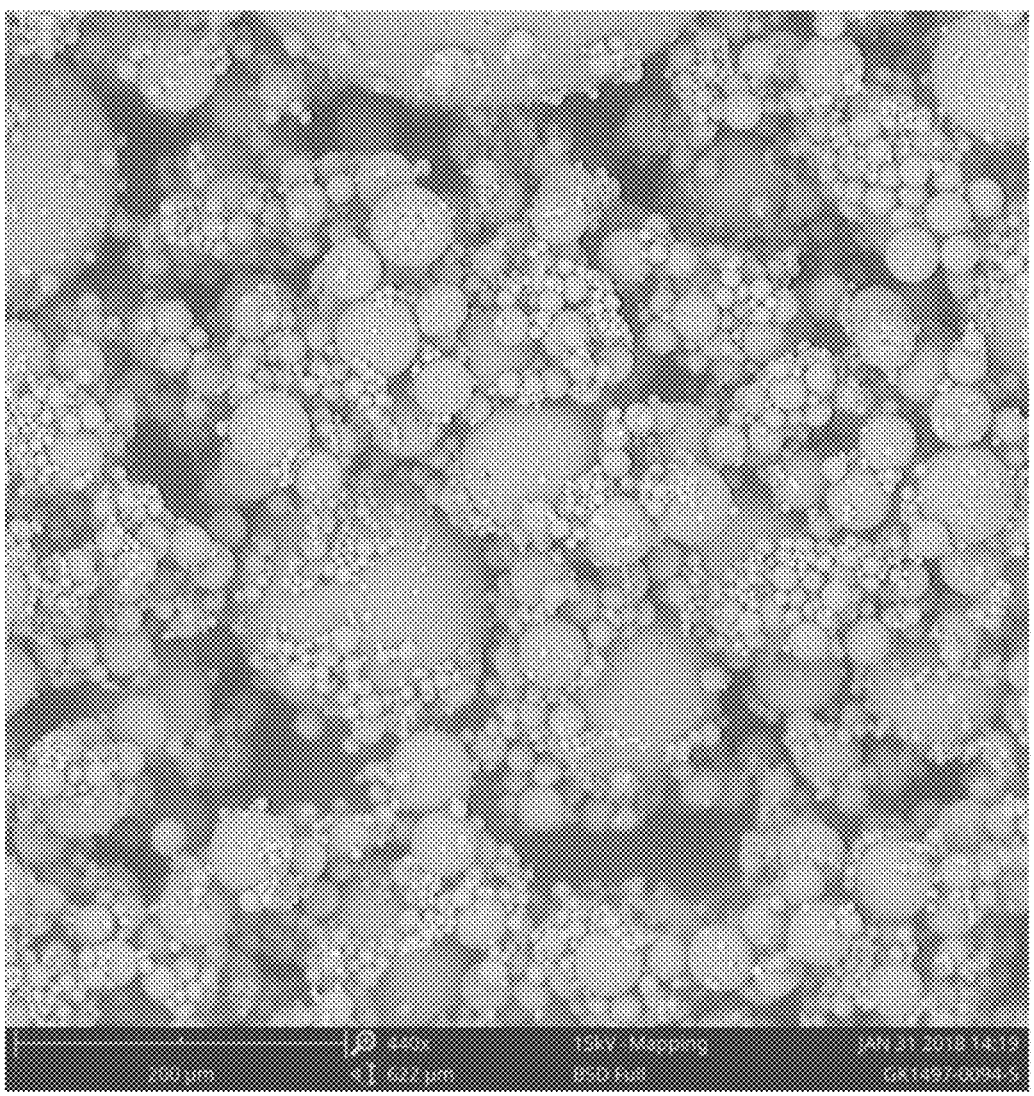
FIG. 2 shows a scanning electron micrograph of the spherical TPU particles produced according to example 1.
Figure 3:
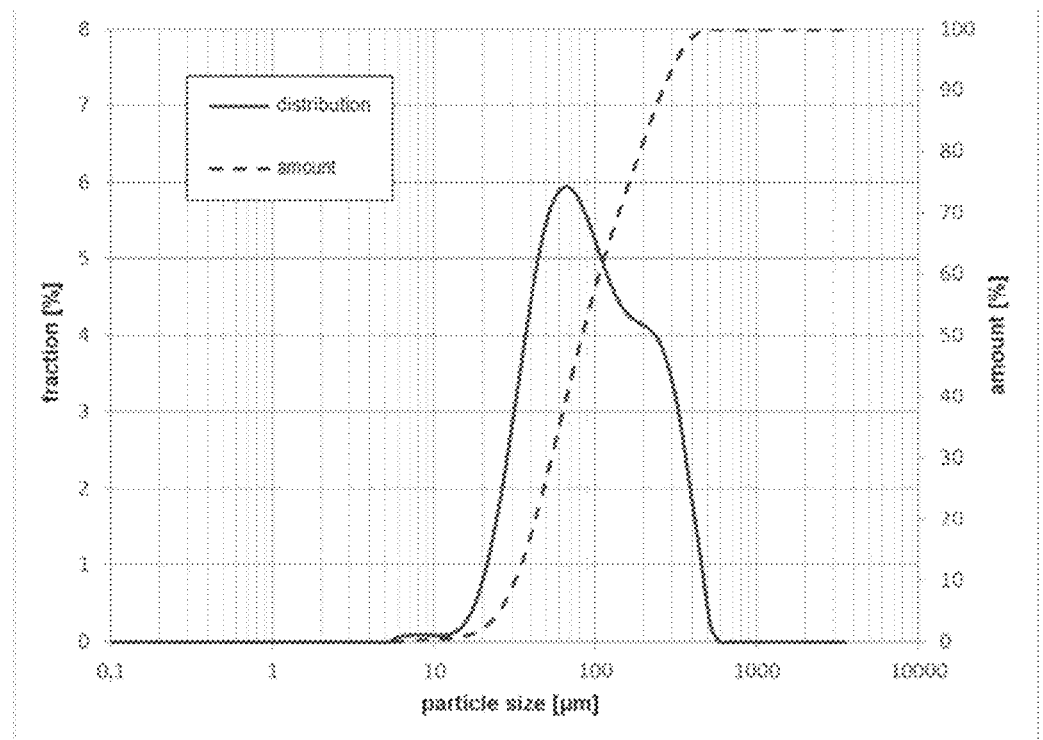
FIG. 3 shows the density distribution and the cumulative volume distribution of the spherical TPU particles produced according to example 2.
Figure 4:
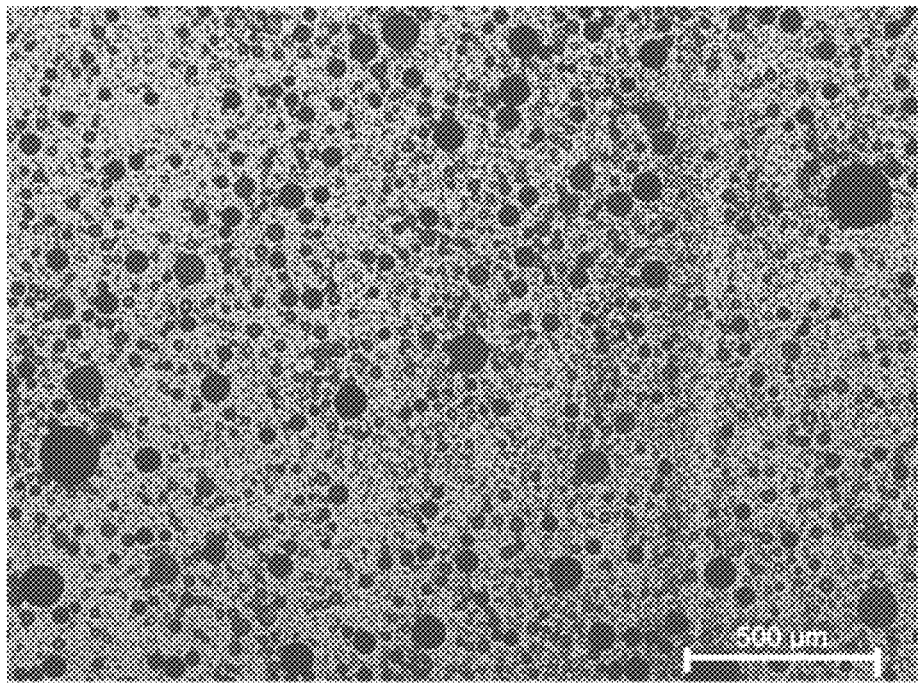
FIG. 4 shows a light micrograph of the spherical TPU particles produced according to example 2.

FIG. 1 shows the density distribution and the cumulative volume distribution of the spherical TPU particles produced according to example 1;

FIG. 2 shows a scanning electron micrograph of the spherical TPU particles produced according to example 1;

FIG. 3 shows the density distribution and the cumulative volume distribution of the spherical TPU particles produced according to example 2;

FIG. 4 shows a light micrograph of the spherical TPU particles produced according to example 2.

CITED LITERATURE

U.S. Pat. No. 8,604,101 B2
J. Schmidt, M. Sachs, S. Fanselow, M. Zhao, S. Romeis. D. Drummer, K.-E. Wirth, W. Peukert, Chemical Engineering Science 156 (2016), 1-10
"Kunststoffhandbuch, 7, Polyurethane", Carl Hanser Verlag, 3rd edition 1993, section 3.1
"Kunststoffhandbuch"; 7, "Polyurethane", Carl Hanser Verlag, 1st edition 1966, pages 103-113

The invention claimed is:

1. A process for producing particles of a thermoplastic polymer in spherical form, the process comprising:
   (i) providing at least one thermoplastic polymer in a molten state;
   (ii) providing an aqueous solution of at least one surface-active substance, wherein the aqueous solution of the at least one surface-active substance is at a temperature in a range from 100 to 300° C.;
   (iii) dispersing the at least one thermoplastic polymer from (i) in the aqueous solution of the at least one surface-active substance from (ii), to obtain an aqueous solution comprising dispersed thermoplastic polymer;
   (iv) cooling down the aqueous solution comprising dispersed thermoplastic polymer to a temperature below a solidification point of the at least one thermoplastic polymer, to obtain a suspension comprising an aqueous solution and particles of the at least one thermoplastic polymer suspended therein in a solid state, wherein the particles are in spherical form;
   (v) separating the particles of the at least one thermoplastic polymer in spherical form from the suspension obtained in (iv); and
   (vi) optionally, drying the particles of the at least one thermoplastic polymer in spherical form that have been separated off in (v);
   wherein the particles of the at least one thermoplastic polymer in spherical form that have been separated off in (v) and optionally dried in (vi) have a particle size distribution having a d[4,3] value of more than 10 µm and a $d_{90.3}$ value of more than 20 µm.

2. The process according to claim 1, wherein (i) comprises:
   (i.1) providing the at least one thermoplastic polymer in a solid state; and
   (i.2) melting the at least one thermoplastic polymer to obtain the at least one thermoplastic polymer in the molten state.

3. The process according to claim 1, wherein the at least one thermoplastic polymer in the molten state is dispersed in the aqueous solution of the at least one surface-active substance in (iii) under action of mechanical force, ultrasound, and/or high-pressure homogenization, to obtain the aqueous solution comprising dispersed thermoplastic polymer.

4. The process according to claim 2, wherein the melting in (i.2) is effected in an extruder or by means of extrusion.

5. The process according to claim 1, wherein the dispersing in (iii) is effected at a temperature in a range from 100 to 300° C.

6. The process according to claim 1, wherein the cooling in (iv) is effected to a temperature in a range from 20 to 100° C.

7. The process according to claim 1, wherein the particles of the at least one thermoplastic polymer in spherical form that are separated off in (v) and optionally dried in (vi) have a particle size distribution having a d[4,3] value of more than 20 µm.

8. The process according to claim 1, wherein the particles of the at least one thermoplastic polymer in spherical form that are separated off in (v) and optionally dried in (vi) have a particle size distribution having a $d_{50.3}$ value of more than 20 µm.

9. The process according to claim 1, wherein the at least one thermoplastic polymer is selected from the group consisting of polyurethane, polyester, polyetherester, polyesterester, polyamide, polypropylene, polyetheramide, polybutadiene-styrene, and ethylene-vinyl acetate.

10. The process according to claim 1, wherein the at least one surface-active substance is selected from the group consisting of polyvinylalcohols.

11. The process according to claim 1, wherein the at least one surface-active substance is present in an amount in a range from 0.1% to 20% by weight, based on a total weight of the aqueous solution of the at least one surface-active substance from (ii).

12. The process according to claim 1, wherein the spherical form of the particles of the at least one thermoplastic polymer is a sphere or an ellipsoid.

13. The process according to claim 7, wherein the particles of the at least one thermoplastic polymer in spherical form that are separated off in (v) and optionally dried in (vi) have a particle size distribution having a $d_{90.3}$ value of more than 50 µm.

14. The process according to claim 9, wherein the at least one thermoplastic polymer comprises a thermoplastic polyurethane (TPU).

15. The process according to claim 10, wherein the at least one surface-active substance is selected from the group consisting of at least partly hydrolysed polyvinylacetates.

* * * * *